(12) United States Patent
Sell

(10) Patent No.: US 10,361,530 B2
(45) Date of Patent: Jul. 23, 2019

(54) LASER APPARATUS WITH DISPERSION CONTROL

(71) Applicant: TOPTICA Photonics AG, Grafelfing (DE)

(72) Inventor: Alexander Sell, Friedrichshafen (DE)

(73) Assignee: TOPTICA Photonics AG, Grafelfing (DE)

( * ) Notice: Subject to any disclaimer, the term of this patent is extended or adjusted under 35 U.S.C. 154(b) by 0 days.

(21) Appl. No.: 15/295,414

(22) Filed: Oct. 17, 2016

(65) Prior Publication Data

US 2017/0110846 A1 Apr. 20, 2017

(30) Foreign Application Priority Data

Oct. 20, 2015 (DE) .................. 10 2015 117 828

(51) Int. Cl.
| | |
|---|---|
| *H01S 3/08* | (2006.01) |
| *H01S 3/109* | (2006.01) |
| *H01S 3/081* | (2006.01) |
| *H01S 3/067* | (2006.01) |
| *H01S 3/16* | (2006.01) |

(52) U.S. Cl.
CPC ...... *H01S 3/08059* (2013.01); *H01S 3/06708* (2013.01); *H01S 3/0809* (2013.01); *H01S 3/0811* (2013.01); *H01S 3/0815* (2013.01); *H01S 3/109* (2013.01); *H01S 3/1608* (2013.01)

(58) Field of Classification Search
CPC .. H01S 3/0092; H01S 3/08004; H01S 3/1608; H01S 3/081; H01S 3/08059; H01S 3/06708; H01S 3/0809; H01S 3/0811; H01S 3/0815; H01S 3/109
See application file for complete search history.

(56) References Cited

U.S. PATENT DOCUMENTS

| | | | |
|---|---|---|---|
| 2002/0163727 A1 | 11/2002 | Kartner et al. | |
| 2011/0274135 A1* | 11/2011 | Kaertner ............. | G02B 5/0825 372/99 |

FOREIGN PATENT DOCUMENTS

DE 10196893 B4 3/2016

\* cited by examiner

*Primary Examiner* — Armando Rodriguez
(74) *Attorney, Agent, or Firm* — Raymond R. Ferrera; Adams and Reese LLP

(57) ABSTRACT

A laser apparatus including a pulsed laser radiation source is disclosed, wherein the laser radiation has spectral components in at least two wavelength ranges W1, W2 that differ from one another, and a dispersion control element including at least one dielectric multilayer mirror, wherein the laser radiation is reflected one or more times at the multilayer mirror. The multilayer mirror is reflective in the two wavelength ranges W1, W2, and the reflection of the spectral component in the second wavelength range W2 has a time delay relative to the reflection of the spectral component in the first wavelength range W1 such that the spectral components of the laser radiation reflected at the multilayer mirror in the two wavelength ranges W1, W2 coincide in time in an interaction center of the laser apparatus, and a nonlinear optical element is situated in the interaction center.

6 Claims, 3 Drawing Sheets a)

b)

LASER APPARATUS WITH DISPERSION CONTROL

The invention relates to a laser apparatus comprising a laser radiation source which generates pulsed laser radiation, wherein the laser radiation has spectral components in at least two wavelength ranges that differ from one another—a first wavelength range and a second wavelength range—, and comprising a dispersion control element comprising at least one dielectric multilayer mirror, wherein the laser radiation is reflected one or more times at the multilayer mirror.

Moreover, the invention relates to a dielectric multilayer mirror for such a laser apparatus, and a method for generating laser radiation.

It is well-known that short laser pulses (with pulse durations in the picosecond and femtosecond range) have a broad wavelength spectrum. Apparatuses for generating pulsed laser radiation, the spectrum of which forms an optical frequency comb with a spectral width of more than one optical octave, are known from the prior art (e.g. with spectral components in wavelength ranges from 800 nm to more than 2000 nm). In order to generate a laser pulse with a minimum pulse duration in an interaction centre of a laser apparatus, in which there is e.g. a nonlinear crystal or a different nonlinear medium for frequency conversion, it is necessary for the different spectral components to coincide in time (and space). As a result of the wavelength-dependence of the refractive index (dispersion) of the media, through which the laser radiation propagates (including the nonlinear medium situated in the interaction centre), the different spectral components experience delay to a different extent. This effect is quantitatively described by the so-called group delay (also referred to as a group delay dispersion, abbreviated GD). The GD is the second frequency derivative of the spectral phase.

In most applications, the GD of the employed optical system needs to be compensated in order to obtain the desired pulse shape of the laser pulses. This is described by the term dispersion compensation, or else dispersion control. Typically, a dispersion control element is provided to this end at a point in the beam path, said dispersion control element generating a GD with the same magnitude as but opposite sign to the GD which the radiation experiences in the remaining optical system of the laser apparatus.

In the prior art, different optical components are used for dispersion compensation, such as prism pairs, grating pairs and dispersive mirrors. Thanks to the large spectral bandwidth thereof, the simplicity of the integration thereof into the optical system and the compactness thereof, use is often made of dielectric multilayer mirrors (also referred to as "chirped mirrors").

In the case of reflection at a multilayer mirror, in which a plurality of transparent layers with changing refractive index (e.g. alternate layers of $SiO_2$ and $TiO_2$) form a Bragg mirror with a varying layer spacing (and a correspondingly varying Bragg wavelength) in the direction perpendicular to the front surface of the mirror, the various wavelength components of the laser radiation penetrate to different depths into the layers of the mirror before they are reflected. As a result, the various spectral components are delayed to different extents, namely in accordance with the respective penetration depth. Since many optical components have a positive GD, a negative GD is usually required for the dispersion compensation. In order to obtain a negative GD, the short-wavelength spectral components are reflected in the upper layers of the multilayer mirror, while the long-wavelength components penetrate deeper into the mirror before they are reflected. In this way, the spectral components with long wavelengths experience a time delay in relation to the components with short wavelengths, leading to the desired negative GD.

A problem arising in this type of multilayer mirrors is that a reflection which is largely independent of the wavelength occurs at the interface of the front most layer with the surroundings, i.e. at the front surface, where the laser radiation is incident. As a result, there is interference between radiation reflected at this front surface and radiation which is reflected deeper inside the multilayer structure of the mirror, with these interference effects causing a distortion of the reflection capability and, in particular, a strong distortion of the dispersion characteristic of the mirror. In order to counteract this effect at least in part, it was proposed to apply an antireflection coating onto the front surface with, at the same time, the thickness of the layers in the layer stack (which is also referred to as fill factor) being varied (cf. F. X. Kärntner et al. "Design and fabrication of double-chirped mirrors", 1997, Optics Letters, volume 22, page 831). Here, the variation of the fill factor causes an adiabatic adaptation of the impedance within the layer stack. Since both the Bragg wavelength and the fill factor are varied, these multilayer mirrors are also referred to as "double-chirped mirrors". Usually, use is made of a computer algorithm to simulate the spread of the electromagnetic field from the laser radiation in the layer stack and thus optimize the properties of the multilayer mirror for the desired application.

Then, the layer stack of the multilayer mirror is manufactured according to the result of the computer algorithm (e.g. by controlled gas vapour deposition of $TiO_2$ and $SiO_2$ on a $SiO_2$ substrate).

FIG. 1 shows a laser apparatus known from the prior art (cf. Optics Letters, 2011, volume 36, pages 540-542). The previously known laser apparatus comprises an erbium fibre laser as radiation source, which generates pulsed laser radiation with a pulse duration in the femtosecond range. The generated laser radiation is spectrally broadened in a nonlinear fibre HNF. The laser radiation emerging from the fibre HNF is collimated by means of a curved mirror M1. The laser radiation is divided among two beam paths by means of a dichroic beam splitter DM. A dispersion control element, which comprises two dielectric multilayer mirrors CM, at which the laser radiation is multiply reflected, is situated in one beam path. A frequency filter F which only transmits a specific spectral component of the laser radiation is situated in the other beam path. The two beam paths are reunified by means of a further dichroic beam splitter DM. The radiation is focused in a nonlinear crystal C by means of a further curved mirror M2. What is achieved by adjusting the delay path D and by a suitable dispersion control by means of the multilayer mirrors CM is that specific spectral components of the laser radiation coincide in time in the interaction centre, i.e. in the nonlinear crystal C. Specifically, the previously known laser apparatus depicted in FIG. 1 serves to bring spectral components of the broadband pulsed laser radiation, to be precise at approximately 800 nm and at approximately 2000 nm, to interact in the nonlinear crystal C such that, by difference frequency generation, pulsed laser radiation at approximately 1550 nm is generated. The spectrum of the laser radiation generated in this way forms an optical frequency comb, the CEO ("carrier envelope offset") frequency of which equals zero due to the difference frequency generation.

The laser apparatus shown in FIG. 1 has disadvantages. A first disadvantage is the complexity of the setup and, in particular, the necessity of establishing the coincidence in time (and space) of the partial beams in the nonlinear crystal by adjustment. This leads to efficiency losses during ongoing operation as a mechanical and thermal drift of the setup is unavoidable. The different beam path of the two partial beams is furthermore disadvantageous because the setup, as a result thereof, reacts sensitively to mechanical disturbances (e.g. by acoustic vibrations). As a result, unwanted phase noise arises in the generated laser radiation.

Against this backdrop, it is an object of the invention to provide a laser apparatus which is improved in relation to the prior art. In particular, the setup thereof should be less complex, require less adjustment outlay and—in particular—be less sensitive to external influences.

Proceeding from a laser apparatus of the type set forth at the outset, the invention achieves this object by virtue of the multilayer mirror being reflective in the two wavelength ranges, the reflection of the spectral component in the second wavelength range having a time delay in relation to the reflection of the spectral component in the first wavelength range such that the spectral components of the laser radiation reflected at the multilayer mirror in the two wavelength ranges coincide in time in an interaction centre of the laser apparatus.

Thus, according to the invention, the two spectral components of the laser radiation are not brought to coincidence in the interaction centre by different optical path lengths in different partial beams. Instead, according to the invention, the spectral components of the laser radiation are always collinear. According to the invention, the coincidence in the interaction centre is achieved by virtue of one spectral component of the laser radiation being delayed overall in time in relation to another spectral component in a manner set by way of the design of the mirror. Within the wavelength ranges, this temporal delay is substantially independent of wavelength in all cases and, in this respect, it should clearly be distinguished from a group delay.

Compared to the prior art, the laser apparatus according to the invention makes do with a significantly reduced number of optical components. It requires substantially less adjustment outlay and is inherently insensitive to external influences such as e.g. acoustic vibrations. A further advantage lies in the fact that, in relation to the prior art, fewer transmissive optical components are required for the laser apparatus according to the invention, which is to the benefit of the quality of the generated laser pulses.

Advantageously, the design of the multilayer mirror of the laser apparatus according to the invention brings about not only a time delay of one spectral component in relation to the other spectral component but also, additionally, a (positive or negative) group delay in each one of the two reflected wavelength ranges. The group delay, which is impressed onto the laser radiation in the first wavelength range and/or the second wavelength range by the multilayer mirror, may in this case be quantitatively different in the respective wavelength ranges.

Therefore, the multilayer mirror used according to the invention has a double function. The multilayer mirror firstly ensures the above-described time delay, which is a precondition for the temporal coincidence of the radiation components of the laser radiation in the interaction centre. Secondly, the multilayer mirror brings about a group delay shift for dispersion compensation, to be precise independently for each one of the reflected spectral components. By contrast, the prior art uses separate optical components for the dispersion compensation and for the time delay. Accordingly, the setup of the laser apparatus according to the invention is significantly simpler and more robust.

Expediently, the multilayer mirror does not reflect possible further spectral components outside of those wavelength ranges in which the multilayer mirror is reflective. Thus, it is transparent in these other wavelength ranges. This can be used to filter out unwanted spectral components by means of the multilayer mirror. Thus, in this configuration, the multilayer mirror even has a threefold function.

Preferably, as in the prior art, there is a nonlinear optical element, in particular a frequency conversion element or else a sum or difference frequency generation element, e.g. in the form of a corresponding nonlinear crystal, in the interaction centre.

The spectrum of the laser radiation may form an optical frequency comb, wherein each one of the at least two wavelength ranges is assigned to a different comb line or a different group of comb lines of the frequency comb. Accordingly, as in the prior art, the nonlinear optical element, which is situated in the interaction centre of the laser apparatus, may convert the laser pulses reflected at the multilayer mirror into laser pulses in a third wavelength range by way of a difference frequency generation, wherein the spectrum of the laser pulses in the third wavelength range forms an optical frequency comb, the CEO frequency of which equals zero. The laser apparatus according to the invention therefore offers the option of generating a frequency comb which is stable in respect of the CEO frequency in a particularly simple and robust manner. For the purposes of stabilizing the frequency comb, it is only necessary to stabilize the repetition frequency of the laser radiation source in a manner known per se (e.g. by means of a high-frequency standard).

The subject matter of the invention furthermore relates to a dielectric multilayer mirror which satisfies the above-described double function (or threefold function) within the laser apparatus according to the invention.

To this end, the multilayer mirror has at least two groups of layer sequences, namely a first layer group and a second layer group, the first layer group forming a first Bragg mirror matched to a first wavelength range and the second layer group forming a second Bragg mirror matched to a second wavelength range which differs from the first wavelength range, with the two layer groups being arranged at different distances from the front surface of the multilayer mirror, with the two layer groups being spaced apart by a transparent spacer layer from one another in a direction perpendicular to the front surface of the multilayer mirror. Preferably, the spacer layer is many times thicker than the distances between the layers within the layer groups. In practical configurations, the layer distances within the first group differ significantly from the layer distances within the second group because the wavelengths of the first wavelength range may deviate correspondingly clearly from the wavelengths of the second wave length range (i.e., by more than 100 nm, usually by several 100 nm, in possible configurations even by more than 1000 nm). The thickness of the spacer layer in turn is independent of the layer distances within the first and second layer groups and accordingly differs therefrom.

In the design of the multilayer mirror, the spectral component of the laser radiation in the first wavelength range is reflected at the first Bragg mirror and the spectral component in the second wavelength range is reflected at the second Bragg mirror. Since the two Bragg mirrors are each situated at a different distance from the front surface of the multilayer mirror, the desired time delay between the two spectral components arises. The value of the time delay is determined by the thickness of the layer groups and, in particular, by the thickness of the transparent spacer layer. Hence, the design of the mirror may be configured for the desired application by predetermining the thicknesses of the layers.

As is conventional in dielectric multilayer mirrors, the layer sequences of the layer groups each comprise a multiplicity of layer pairs adjoining one another, with each layer pair having two transparent layers which differ from one another in terms of refractive index. A configuration with alternate layers made of $SiO_2$ and $TiO_2$ has proven its worth.

Expediently, the distance the layers have from one another within at least one of the layer groups varies in a direction perpendicular to the front surface of the multilayer mirror. This corresponds to the design of conventional "chirped" mirrors in order to obtain the desired dispersion compensation.

More preferably, the thickness ratio of the layers from layer pair to layer pair within at least one of the layer groups also varies in a direction perpendicular to the front surface of the multilayer mirror. This variation of the fill factor brings about impedance matching of the various layers.

Additionally, the multilayer mirror is expediently impedance-matched to the surrounding medium (air, for example) at the front surface thereof in order to avoid reflections at the front surface.

Overall, the design of the dielectric multilayer mirror according to the invention may be referred to as triple chirped. This relates to the variation of the layer spacing, i.e. the Bragg wavelength within each one of the Bragg mirrors for the dispersion compensation. Additionally, the fill factor varies within each layer group, to be precise in independent fashion to the front and rear side of the respective Bragg mirror, in order to realize the desired adiabatic impedance matching. The impedance matching is advantageous for the function of the multilayer mirror overall since it reduces the reflectivity and the group velocity dispersion of the respective Bragg mirror outside of the wavelength range to which the Bragg mirror is matched. This is of particular importance for the combination, according to the invention, of a plurality of Bragg mirrors in a single dielectric multilayer mirror.

Finally, the invention also relates to a method for generating laser radiation, comprising the following method steps:
generating pulsed laser radiation, the laser radiation having spectral components in at least two wavelength ranges that differ from one another—a first wavelength range and a second wavelength range—, and
compensating dispersion, with the laser radiation being reflected one or more times at at least one dielectric multilayer mirror (MCM). According to the invention, the reflection of the spectral component in the second wavelength range has a time delay in relation to the reflection of the spectral component in the first wavelength range such that the spectral components of the reflected laser radiation in the two wavelength ranges coincide in time in an interaction centre.

Exemplary embodiments of the invention are explained in more detail below on the basis of the drawings. In detail:

Figure 1:
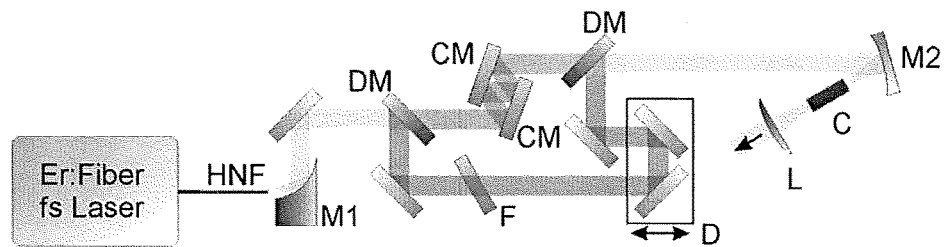
FIG. 1 shows a schematic illustration of a laser apparatus according to the prior art.

The laser apparatus schematically depicted in FIG. 2a has an erbium fibre laser as laser radiation source, which emits pulsed laser radiation with a pulse duration in the femtosecond range. The spectrum of the pulsed laser radiation is spectrally broadened in a highly nonlinear fibre HNF by way of self-phase modulation. The radiation emerging from the fibre HNF is reflected at a curved mirror M1. The laser apparatus has a dispersion control element which consists of a dielectric multilayer mirror MCM in the illustrated exemplary embodiment, with the laser radiation being multiply reflected at said multilayer mirror. The laser radiation from the laser radiation source has (inter alia) two spectral components, to be precise in a first wavelength range at approximately 800-900 nm and in a second wavelength range at approximately 1700-2200 nm. The dielectric multilayer mirror MCM of the dispersion control element is reflective in both of these wavelength ranges. The dielectric multilayer mirror MCM is substantially transparent outside of these two wavelength ranges. This means that interfering components of the laser radiation, for example at approximately 1500 nm, are filtered out of the laser radiation reflected at the dielectric multilayer mirror MCM. Moreover, according to the invention, the reflection of the long-wavelength spectral component, i.e. in the second wavelength range, has a time delay in relation to the short-wavelength spectral component, i.e. in the first wavelength range. The laser radiation thus reflected at the dielectric multilayer mirror MCM is then focused in a nonlinear crystal C by means of a second curved mirror M2. A consequence of the time delay of the long-wavelength spectral component caused by the dielectric multilayer mirror MCM is that the two spectral components coincide at the focus in time (and space), i.e. in the nonlinear crystal C situated in the interaction centre of the laser apparatus. At the same time, the multilayer mirror MCM impresses a group delay onto the laser radiation in each one of the two wavelength ranges, in each case in a targeted manner, and so the dispersion of the system overall (and for both wavelength ranges independently) is compensated in such a way that the pulse length of the laser radiation in both wavelength ranges is minimal, i.e. bandwidth limited to the greatest possible extent, in the focus within the nonlinear crystal C. Here, the dispersion compensation is carried out in such a way that, in the case of the reflection at the dielectric multilayer mirror MCM, the group delay dispersion occurring in the nonlinear crystal C is pre-compensated.

In the exemplary embodiment, pulsed laser radiation in a third wavelength range is generated by nonlinear difference frequency generation in the crystl C by virtue of the wavelength of the difference frequency corresponding to the two spectral components at 800-900 nm and 1700-2200 nm. The laser radiation correspondingly thus generated at approximately 1500 nm leaves the laser arrangement through a lens L. The spectrum of the laser pulses in the third wavelength range forms an optical frequency comb at approximately 1500 nm, wherein the CEO frequency of the frequency comb is exactly equal to zero due to the difference frequency generation. The spectral component at approximately 1500 nm which is originally contained in the spectrum of the laser radiation after emergence from the nonlinear fibre HNF (and afflicted by a non-stabilized CEO frequency) is, as described above, filtered out by the dielectric multilayer mirror MCM, which is not reflective in this wavelength range, and so this spectral component does not interfere with the radiation leaving the laser apparatus.

In a corresponding way, the depicted setup can also be advantageous used for the purposes of the sum frequency generation.

In the exemplary embodiment depicted in FIG. 2b, the radiation emerging from the highly nonlinear fibre HNF is reflected at a curved mirror M1 and then reflected at the multilayer mirror MCM. The laser radiation is reflected back at a plane mirror, and so there is another reflection at the dielectric multilayer mirror MCM and at the curved mirror M1. The nonlinear crystal C is situated at the focus of the mirror M1. Otherwise, the function corresponds to the exemplary embodiment depicted in FIG. 2a.

In the laser apparatuses according to the invention depicted in FIGS. 2a and 2b, the space-time overlap of the various spectral components in the interaction centre, i.e. in the nonlinear crystal C, is ensured intrinsically due to the function of the dielectric multilayer mirror MCM. A necessary adjustment in relation to external influences (mechanical faults, thermal drift, etc.), which is required in the laser apparatus depicted in FIG. 1, is dispensed with.

Furthermore, it is possible to identify in FIGS. 2a and 2b that the spectral components of the laser radiation propagate completely collinearly, unlike in the apparatus shown in FIG. 1, making the laser apparatus according to the invention extremely robust in relation to external influences (e.g. acoustic vibrations). The additionally impressed phase noise of the generated laser radiation as a result of the build up of the laser radiation is correspondingly low. Furthermore, it is possible to identify that the number of required optical components is significantly reduced in relation to the prior art. The only transmitting optical components are the nonlinear crystal C and the lens L. As a result, the overall dispersion of the system is minimal, as a result of which the quality of the generated laser pulses profits.

Figure 3:
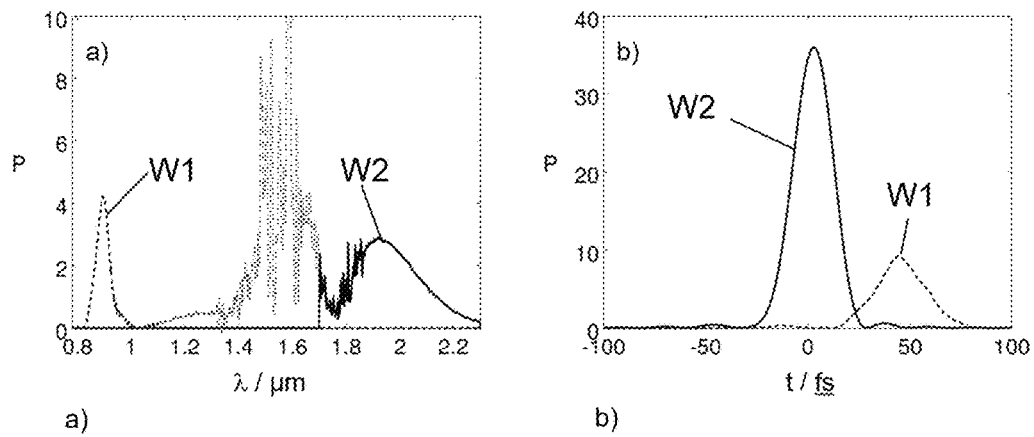
FIG. 3 shows the spectrum and pulse shapes of laser pulses of the laser radiation source of the apparatus according to the invention.

FIG. 3a shows, in an exemplary manner, a spectrum of the laser radiation at the output of the erbium fibre laser. The spectrum extends substantially continuously from approximately 800 nm to 2200 nm. The dominant spectral components in the range between 800 and 900 nm (first wavelength range W1) and 1700-2200 nm (second wavelength range W2) can be identified in FIG. 3a. Moreover, it is possible to identify a broad continuum between the first wavelength range W1 and the second wavelength range W2, i.e. between 900 and 1700 nm.

Figure 2:
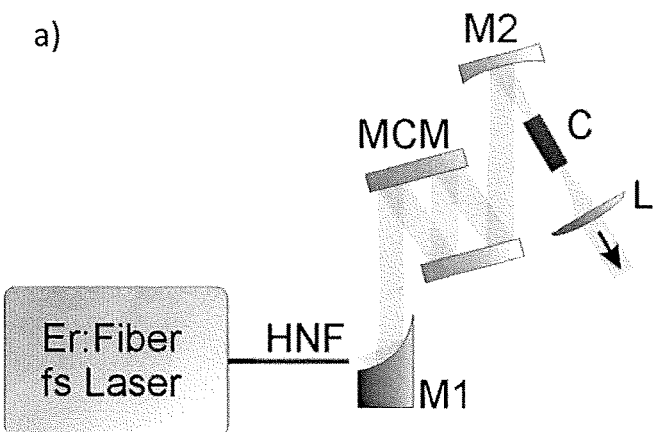
FIG. 2 shows schematic illustrations of laser apparatuses according to the invention.
Figure 2:
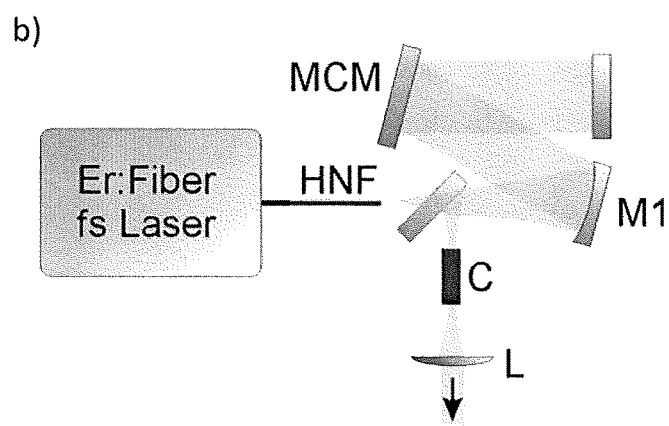

FIG. 3b shows the time curve of the light pulses at the output of the highly nonlinear fibre HNF in the exemplary embodiments depicted in FIG. 2. It is possible to identify that the laser pulse in the first wavelength range W1 temporally trails the laser pulse in the second wavelength range W2. That is to say, the spectral components in the various wavelength ranges do not coincide at the output of the highly nonlinear fibre HNF.

Figure 4:
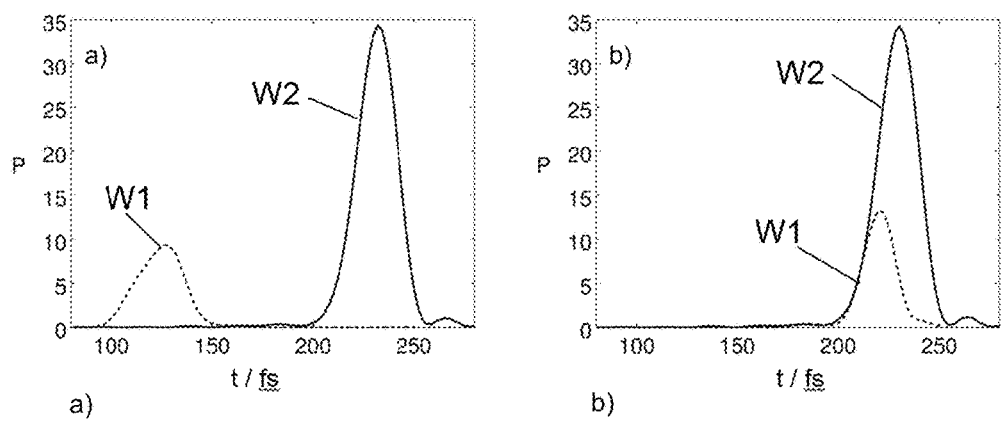
FIG. 4 shows laser pulses after reflection at the multilayer mirror and in the interaction centre of the laser apparatus according to the invention.

FIG. 4a shows the time curve of the laser pulses at the output of the dispersion control element, i.e. after twofold reflection at the multilayer mirror MCM in accordance with FIGS. 2a and 2b. By comparison with FIG. 3b, it is possible to identify that the long-wavelength light pulse W2 has a time delay of approximately 150 femtoseconds in relation to the short-wavelength light pulse W1 after the reflection at the multilayer mirror MCM. As a result, the dispersion is compensated in such a way that the two spectral components W1 and W2 of the light pulses coincide in time in the interaction centre, i.e. at the focus within the nonlinear crystal C, as shown in FIG. 4b.

At the same time, both spectral components at the focus within the nonlinear crystal C are short, virtually in a bandwidth-limited manner, and thus achieve a high peak power, as can likewise be seen in FIG. 4b.

Figure 5:
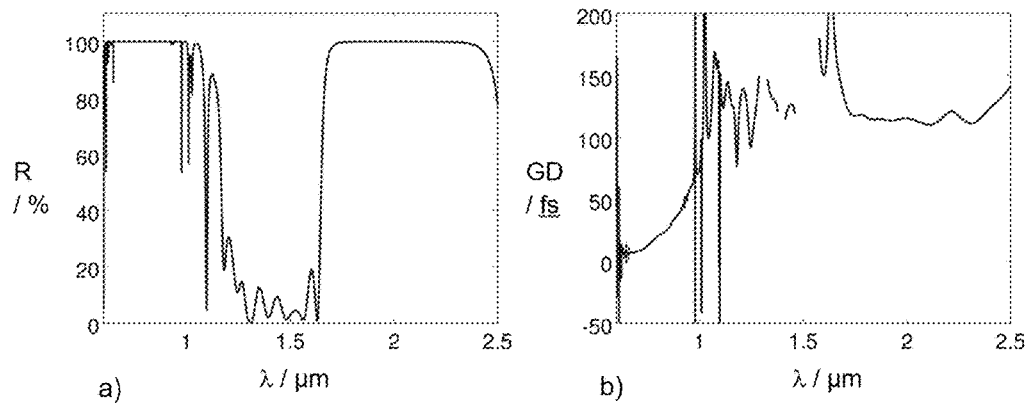
FIG. 5 shows a wavelength-dependent reflectivity and group delay of the multilayer mirror according to the invention (simulation calculation)

FIG. 5a shows the reflection spectrum of the dielectric multilayer mirror MCM employed according to the invention (simulation calculation). It is possible to identify that the multilayer mirror MCM has a minimal transmission, i.e. a maximum reflection R, in the range between 800 and 900 nm and in the range from 1700 to more than 2200 nm. In the range between approximately 1450 and 1650 nm, the reflection is virtually 0%, i.e. the dielectric multilayer mirror MCM virtually does not reflect in this spectral range. As described above, this is employed to filter out interfering components contained in the laser radiation in this spectral range.

FIG. 5b shows the spectrum of the group delay impressed by the dielectric multilayer mirror MCM according to the invention. In the range between 800 and 900 nm, i.e. in the first wavelength range, the chirp lies at approximately +0.3 fs/nm.

Figure 6:
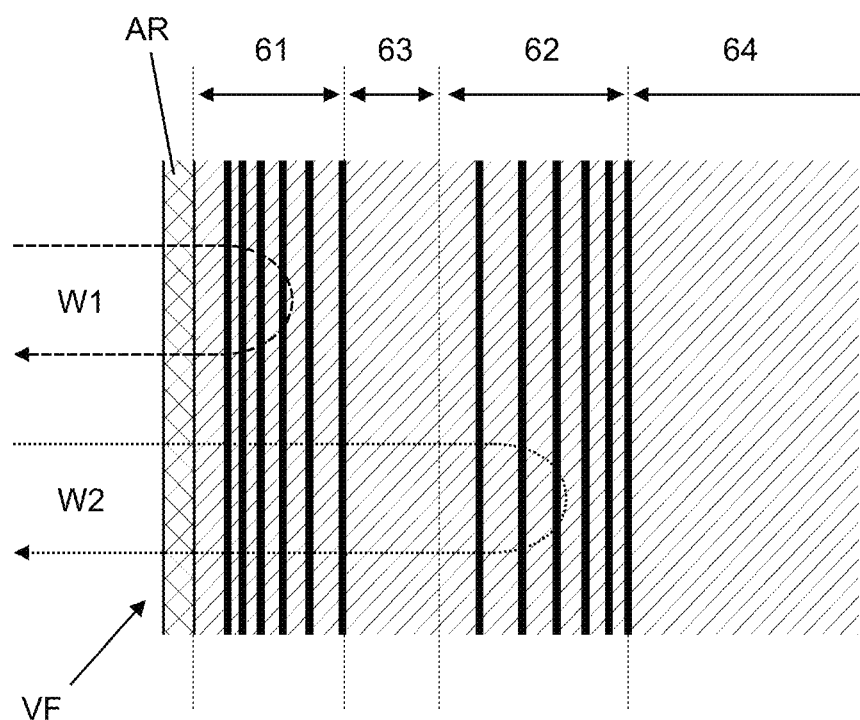
FIG. 6 shows a schematic illustration of the setup of the multilayer mirror according to the invention.

FIG. 6 schematically illustrates the setup of the dielectric multilayer mirror according to the invention. FIG. 6 shows a sectional illustration, with the sectional plane extending perpendicular to the front surface VF of the mirror. The mirror comprises two groups of layer sequences, namely a first layer group 61 and a second layer group 62. The layer groups each have a plurality of layer pairs adjoining one another, with each layer pair having two transparent layers which differ in terms of the refractive index.

In practice, this is achieved by alternate layers made of e.g. $SiO_2$ and $TiO_2$. In FIG. 6, the $TiO_2$ layers are depicted dark. The $SiO_2$ layers are hatched. The first layer group 61 forms a first Bragg mirror matched to the first wavelength range. The second layer group 62 forms a Bragg mirror matched to the second wavelength range. As can be identified in FIG. 6, the two layer groups 61, 62 are arranged at different distances from the front surface VF of the multilayer mirror. The two layer groups 61, 62 are separated from one another in the direction perpendicular to the front surface of the multilayer mirror by way of a transparent spacer layer 63. The reflection of the spectral component in the first wavelength range W1 at the layer group 61 and the reflection of the spectral component in the second wavelength range W2 at the layer group 62, which lies deeper in the multilayer mirror, is shown schematically. According to the invention, the time delay of the reflection in in the second wavelength range W2 in relation to the reflection in the first wavelength range W1 is achieved as a result thereof. The time delay can be set quantitatively by predetermining the thickness of the spacer layer 63. FIG. 6 furthermore indicates that the distance of the layers from one another varies within both layer groups 61, 62 in the direction perpendicular to the front surface VF of the multilayer mirror. In this respect, the design of each one of the layer groups 61, 62 per se corresponds to the design of conventional chirped mirrors, as a result of which a group delay is impressed onto the reflected radiation for the purposes of dispersion compensation. FIG. 6 does not depict that, moreover, the thickness of the layers within both layer groups 61, 62 (i.e. the fill factor) varies to the front side and the rear side of each layer group 61, 62 in order thus to obtain adiabatic impedance matching between the layers. At the front surface VF, the multilayer mirror has an antireflection coating AR. The thickness of the substrate layer 64 adjoining on the rear side is irrelevant to the function of the multilayer mirror. However, reflections by the rear side of the substrate of the light to be transmitted should be suppressed in a suitable manner, e.g. by a wedge form of the substrate, in which the front surface and the rear side surface of the substrate do not extend parallel to one another, by roughening the substrate rear side or by a suitable antireflection coating.

The invention claimed is:

1. A laser apparatus comprising a laser radiation source which generates pulsed laser radiation, wherein the laser radiation has spectral components in at least two wavelength ranges that differ from one another—a first wavelength range (W1) and a second wavelength range (W2)—, and comprising a dispersion control element comprising at least one dielectric multilayer mirror (MCM), wherein the laser radiation is reflected one or more times at the multilayer mirror (MCM), wherein the multilayer mirror (MCM) is reflective in the two wavelength ranges (W1, W2), the reflection of the spectral component in the second wavelength range (W2) having a time delay in relation to the reflection of the spectral component in the first wavelength range (W1) such that the spectral components of the laser radiation reflected at the multilayer mirror (MCM) in the two wavelength ranges (W1, W2) coincide in time in an interaction centre of the laser apparatus, and further comprising a nonlinear optical element (C) situated in the interaction center.

2. The laser apparatus as claimed in claim 1, wherein the multilayer mirror (MCM) in each case imparts a group delay on the laser radiation in at least one of the first and second wavelength range.

3. The laser apparatus as claimed in claim 1, wherein the spectrum of the laser radiation forms an optical frequency comb, wherein each one of the at least two wavelength ranges (W1, W2) is assigned to a different comb line or a different group of comb lines of the frequency comb.

4. The laser apparatus as claimed in claim 1, wherein the nonlinear optical element (C) converts the laser pulses reflected at the multilayer mirror (MCM) into laser pulses in a third wavelength range by way of a difference frequency generation.

5. The laser apparatus as claimed in claim 4, wherein the spectrum of the laser pulses in the third wavelength range forms an optical frequency comb, the CEO frequency of which equals zero.

6. The laser apparatus as claimed in claim 1, wherein said nonlinear optical element (C) is a frequency conversion element or a sum or difference frequency generation element.

* * * * *